Figure 3:
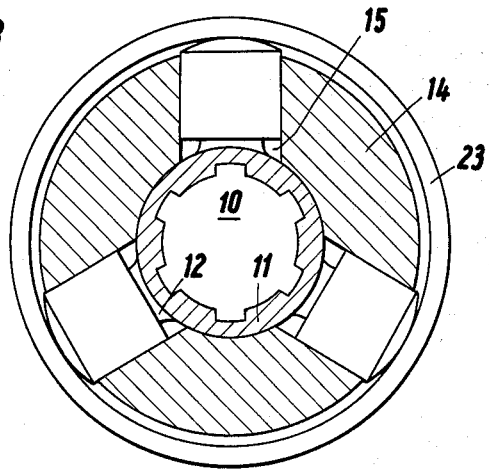

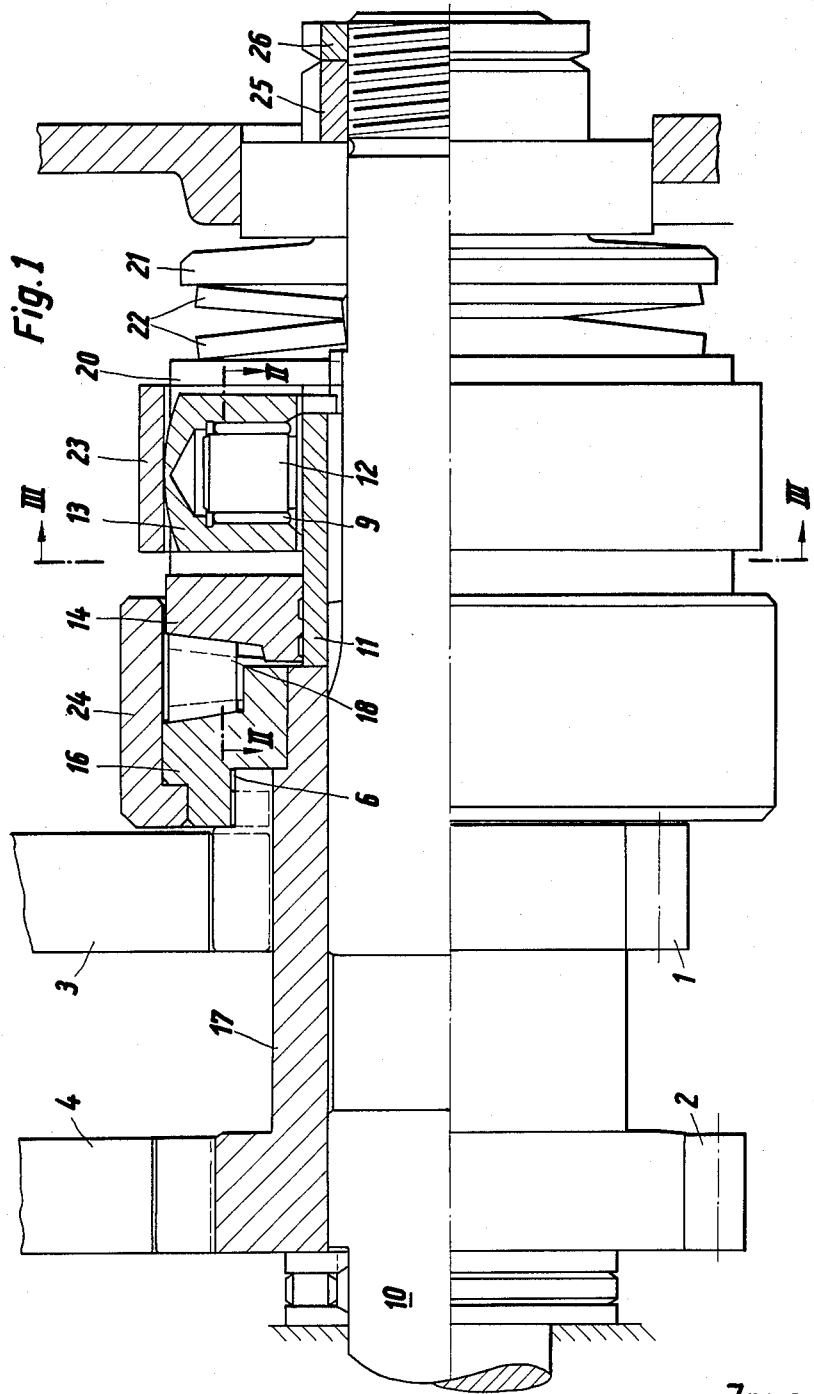

May 24, 1966 H. HOFMANN 3,252,300
SHOCK ABSORBING CLUTCH
Filed Nov. 8, 1963 2 Sheets-Sheet 2

Inventor:

United States Patent Office 3,252,300
Patented May 24, 1966

---

3,252,300
SHOCK ABSORBING CLUTCH
Hans Hofmann, Immenstaad, Germany, assignor to Zahnradfabrik Friedrichshafen Aktiengesellschaft, Friedrichshafen, Germany
Filed Nov. 8, 1963, Ser. No. 322,348
Claims priority, application Germany, Nov. 17, 1962, Z 9,772
4 Claims. (Cl. 64—27)

This invention relates to clutches and more particularly to clutches capable of transmitting sudden changes in load without shock.

Prior art clutches have been known wherein rolling elements between clutch components have been used for transfer of torque such that, on overload, the rolling elements ride into recesses of the clutch faces and interrupt torque transmission. This requires reengagement of the clutch components by hand manipulation.

Another type of prior art arrangement comprises the use of spring pressed balls acting in notches of the clutch components in such a manner that, when the clutch is transmitting torque beyond a predetermined limit, a positive drive between the clutch component occurs. Such clutches have considerable disadvantageous friction in the course of operation.

The present invention seeks to overcome the disadvantages of the prior art and has among its objects the provision of a shock absorbing clutch such that load changes will not cause shock or vibration on the clutch components, nor on the driving and driven power elements connected thereto.

Another object of the invention is to provide a shock and vibration absorbing clutch which is inherently simple and rugged in construction.

Further objects and purposes of the invention will be apparent from the description to follow.

Briefly, the invention comprises a pair of clutch components having opposed recesses which provide slanted surfaces in mirror image disposition against which conical rollers engage. Such surfaces are somewhat oblique to the rotary axis of the clutch components in two planes in order to effect an angularity complemental to the conical rollers.

One clutch component is keyed for drive from a drive shaft and is resiliently pressed against the conical rollers which in turn press against the driven clutch component. The recesses of the clutch components terminate in pockets in which the conical rollers are normally disposed to effect drive up to a predetermined torque. However, upon load increase, the rollers ride out of the pockets and along the clutch component slanted surfaces thus absorbing resiliently any shock or vibration caused by the increase in load. The construction is such that the driving clutch component is supported directly on the drive shaft and is keyed for rotation therewith, thus eliminating the need for shaft bearings. Such component is capable of axial movement with respect to the drive shaft to increase resilient pressure on the conical rollers by virtue of relative rotation between the clutch components due to load increase. Further, the initial resilient stress on the driven clutch component is adjustable in order to provide a predetermined torque transmission in the initial position of the conical rollers.

Figure 2:
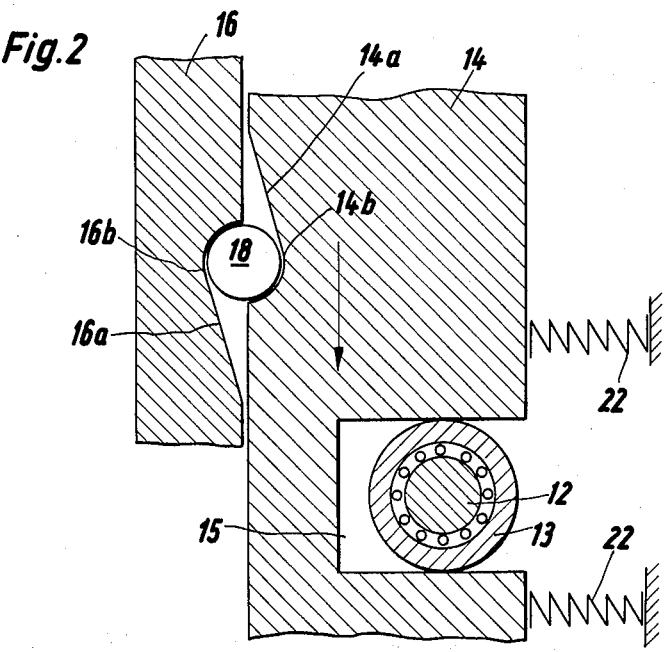

In the drawing:
FIG. 1 is a longitudinal view partially in cross-section showing the essential elements in relationship to each other;
FIG. 2 is a section through II—II of FIG. 1; and
FIG. 3 is a section through III—III of FIG. 1.

Referring to the drawing, a drive shaft 10 is shown on which is mounted a collar 11, which collar will be understood to be keyed for rotation with the drive shaft but axially slidable with respect thereto as by the splining arrangement shown. Secured to collar 11 are three radial journals or stub shafts 12 in the triangular or star array shown in FIG. 3 and each such journal carries a concentric bearing collar 13 having engagement with the respective journal via needle bearings 9, as seen by comparison of FIGS. 1 and 2.

The collars 13 are closed at their outer ends and are encompassed by a ring 23 to maintain them in radial position.

Thus, shaft 10 drives collar 11 and journals 12 to rotate a drive clutch component 14 by means of engagement of collars 13 within respective recesses 15 (FIG. 2) of clutch component 14. It will be noted that the recesses 15 are radial and have sufficient axial length so that the clutch component 14 may shift axially with respect to the collars 13, which drive it rotationally.

Coacting with the clutch drive component 14 is the clutch driven component 16 and intermediate these components are a plurality of rollers 18 which are conical in shape, as seen in FIG. 1, and which are disposed in oblique opposed pairs of recesses of the clutch components, as seen in FIG. 2. Thus, the recesses comprise doubly oblique walls or surfaces 14a and 16a, terminating in respective pockets 14b and 16b, which are conical recesses matching the rollers. The surfaces of the recesses are at an angle in two intersecting planes with respect to the axis of the drive shaft, as will be understood by comparison of FIGS. 1 and 2. The rollers 18 are free to move out of the pockets and along the slanted surfaces when a torque transmission beyond that which is predetermined occurs. An encompassing ring 24 carried on clutch component 16 retains the rollers radially between the clutch components and it will be understood that any number of rollers 18 may be provided, depending upon the application of the clutch, size requirements, loads to be transmitted, etc.

A spring bias is maintained on the clutch component 14 via a pressure plate 20 engaging therewith and against which dish springs 22 press. The springs are pre-stressed via a plate 21 which can be shifted axially to compress the springs by a nut 25 and locknut 26 threadedly carried on shaft 10.

It will thus be understood that axial motion can be effected of clutch component 14 to bring it into engagement with the rollers 18, the reaction of the rollers being supported by the driven clutch component 16 which is splined by splines 6 and 7 to a sleeve 17. Sleeve 17 is rotative on the drive shaft and carries gears 1 and 2 which mesh with driven gears 3 and 4, respectively, of a power transmission (not shown) or other device in a conventional manner.

Axial motion of component 16 toward the left (FIG. 1) is positively blocked by the shoulder engagement thereof with sleeve 17, as is obvious on FIG. 1.

It will be noted that the pressure exerted on the clutch component 14 through the springs by means of the adjusting nuts will pre-stress the gripping engagement of the rollers in their respective pockets (FIG. 2), the springs 22 being indicated only symbolically in FIG. 2.

Accordingly, should the driven component 16 meet increased load resistance, a relative movement of the driving component 14 will occur in the direction of the arrow (FIG. 2), the clutch rotation direction, to cause the rollers to leave the pockets 14b and 16b and ride on the slanting surfaces 14a and 16a. This will have the effect of pushing the clutch component 14 to the right (FIG. 1), thus further compressing the springs 22 and acting to provide increased torque transmission to meet the load increase. The shifting of the drive component 14 has no interference with the collars 13 due to the axial depth of the recesses 15.

This ability to increase torque from the driving side to the driven side by a resilient action effects shock absorption and vibration absorption in the operation of the clutch under changing load and such self-adjustment of torque transmission can be made sensitive to even small load fluctuation. The net result of the operation of the clutch is to remove the transmittal of shock and vibration and its harmful effects, and the relative axial motion provided between the drive component 14 and the rollers 13 aids in this purpose.

Having thus described the invention, it is realized that changes may be made without departing from the spirit thereof and, therefore, it is not desired that the invention be limited to the precise illustration herein given except as set forth in the following claims.

What is claimed is:

1. A shock absorbing clutch comprising a pair of coaxial clutch components having opposed recessed surfaces oblique to the clutch axis and arranged in pairs, a roller between each pair of recessed surfaces, and means for effecting an adjustable resilient pressure of said clutch components on said rollers, including a drive shaft, said clutch components being mounted on said shaft, one of said clutch components being provided with radial recesses at one face thereof and wherein said recessed surfaces thereof are on the other face thereof, said radial recesses on said one face being axially elongated, said one clutch component having axial movement on said shaft, and means extending radially from said shaft into said radial recesses to drive said one clutch component.

2. A shock absorbing clutch comprising a drive shaft, a pair of components coaxially disposed thereon, each of said clutch components having obliquely disposed recesses wherein said recesses are arranged in pairs relative said components, a conical roller intermediate each pair of recesses, spring means disposed on said shaft and abutting one of said clutch components, manual adjusting means disposed on said shaft operative to stress said spring means so as to resiliently bias said one clutch component for effecting predetermined gripping engagement of said rollers intermediate said clutch components for predetermined torque transmission, said clutch components being mounted on said drive shaft, one of said clutch components being provided with radial recesses at one face thereof and wherein said recessed surfaces thereof are on the other face thereof, said radial recesses on said one face being axially elongated, said one clutch component having axial movement on said shaft, and a star array of roller means extending radially from said shaft into said radial recesses to drive said one clutch component.

3. A shock absorbing clutch as set forth in claim 1, said adjustable resilient pressure means comprising a spring means carried on said drive shaft, means for effecting resilient stress transmittal from said spring means to said one clutch component, means carried on said shaft for effecting an adjustable pre-stressed condition of said spring means to effect a predetermined stress on said one clutch component.

4. A shock absorbing clutch comprising a pair of coaxial clutch components having opposed recessed surfaces oblique to the clutch axis and arranged in pairs, a roller between each pair of recessed surfaces, and means for effecting an adjustable resilient pressure of said clutch components on said rollers, including a drive shaft, said clutch components being mounted on said shaft, one of said components being provided with radial recesses at one face thereof wherein said recessed surfaces are on the other face thereof, said radial recesses on said one face being axially elongated, said one clutch component having axial movement on said shaft, and roller means extending radially from said shaft into said radial recesses to drive said one clutch component, and a sleeve carried rotatively on said shaft and gear means carried thereon, the other clutch component being keyed to said sleeve and carried thereon.

References Cited by the Examiner
UNITED STATES PATENTS

| 1,631,196 | 6/1927 | Froesch | 64—27 |
| 1,956,733 | 5/1934 | Small | 64—27 |
| 2,782,813 | 2/1957 | Dudek | 64—30 |
| 3,050,965 | 8/1962 | Landrum | 64—29 |
| 3,117,432 | 1/1964 | Schleicher | 64—27 |

BROUGHTON G. DURHAM, *Primary Examiner.*

H. C. COE, *Assistant Examiner.*